INVENTOR
Joseph Zemanek, Jr.
BY
ATTORNEY

INVENTOR
Joseph Zemanek, Jr.

BY

ATTORNEY

July 5, 1966   J. ZEMANEK, JR   3,259,880
TIME VARIABLE GATING FOR ACOUSTIC LOGGING
Filed Sept. 5, 1962   5 Sheets-Sheet 3

INVENTOR
Joseph Zemanek, Jr.
BY
ATTORNEY

INVENTOR
Joseph Zemanek, Jr.

ATTORNEY

United States Patent Office

3,259,880
Patented July 5, 1966

3,259,880
TIME VARIABLE GATING FOR ACOUSTIC LOGGING
Joseph Zemanek, Jr., Dallas, Tex., assignor to Socony Mobil Oil Company, Inc., a corporation of New York
Filed Sept. 5, 1962, Ser. No. 221,504
6 Claims. (Cl. 340—18)

The present invention relates to well logging and more particularly to the measurement of the velocity and amplitude of elastic impulses or waves which travel through the formations adjacent a well bore.

In the search for mineral deposits, it is often desirable to obtain as much information as possible about the formations adjacent the bore hole. Thus, it is common to procure samples of the material removed during the drilling operations which are subjected to various tests. In addition, many different measurements of the properties of the formations in situ may be made. Logs of self potential, electrical resistivity, and radioactivity are commercially available and extensively used in the petroleum industry.

Useful data as to the characteristics of the formations adjacent a bore hole may also be obtained by measurement of the velocity of the acoustic energy through short lengths of the earth formations penetrated by a bore hole. The acoustic properties of a given stratum are intimately related to its porosity, permeability and fluid content and, thus, measurements that are related directly to and controlled principally by the acoustic properties of the stratum constitute valuable information to geologists and geophysicists in their studies of sub-surface lithology.

Acoustic well logging is also useful in certain production operations. Thus, for example, the amplitude of the acoustic pulses may be measured to provide an indication as to whether a satisfactory bond exists between the casing and the cement used for sealing certain portions of the bore hole.

In United States Patent Serial No. 2,704,364, now Reissue Patent Serial No. 24,446, that was reissued on March 25, 1958, an improved system for measuring the time interval for transit of an acoustic impulse between selected spaced points is disclosed. In accordance with one embodiment of the invention disclosed in the above referenced reissue patent, there is provided a system for measuring the interval between a generation of an elastic impulse at a transmitter positioned in a well bore and the generation of a voltage pulse at a receiver supported in a predetermined space relationship from the transmitter upon arrival at the receiver of the elastic impulse. A voltage that varies monotonically from a predetermined initial value following the generation of the elastic impulse is connected in a circuit with a capacitive element and a normally open switch. The switch is momentarily closed in response to the voltage pulse generated by the receiver to charge the capacitive element to a voltage equal to the magnitude of the monotonically varying voltage at the instant of arrival of the elastic impulse at the receiver. The charge on the capacitor provides an indication of the transit time and hence the velocity of an acoustic impulse through a selected section of formation adjacent a well bore.

The present invention constitutes an improvement over the above described invention. In practicing the present invention, storage means is provided for storing an electrical quantity representative of the transit time required for an acoustic pulse to travel from one transducer to a second transducer. The storage means is actuated by circuit means effective responsive to the arrival of acoustic energy at the second transducer, the circuit means being enabled at a time following the appearance of acoustic energy at the first transducer related to the time interval represented by the electrical quantity stored by the storage means. By relating the time at which the circuit means is enabled to the transit time of the last preceding acoustic pulses as indicated by the stored electrical quantity, the circuit means can be enabled immediately prior to the arrival of acoustic energy at the second transducer thereby minimizing the possibility that spurious noise will create a false indication as to the acoustic velocity of the formation of interest.

Either digital or analogue storage means can be utilized in practicing the invention. However, in the present state of the art, analogue storage means appear to be the less expensive. The invention will, therefore, be described with reference to certain preferred embodiments that utilize analogue storage means, and more particularly a capacitor.

According to one embodiment of the invention, a voltage that varies monotonically from a predetermined initial value following the appearance of acoustic energy at the first transducer is connected in series with a normally open switch and a capacitor which functions as the storage means. The capacitor is charged to a voltage equal to the magnitude of the amplitude of the monotonically varying voltage when the circuit means causes the normally open switch to momentarily close responsive to the appearance of acoustic energy at the second transducer. The potential to which the capacitor is charged provides a variable bias to a pulse forming circuit; the time duration of the pulse produced by the pulse forming circuit being related to the transit time represented by the voltage to which the capacitor is charged. The variable length pulse is utilized to enable the circuit means immediately prior to the appearance of the acoustic energy at the second transducer.

According to another embodiment of the invention, two recording channels are connected to a single conductor through which flow electrical signals indicative of the presence of acoustic energy. The first channel is enabled at a time following a reference time related to but less than the last preceding time interval for electrical signals to first appear on the conductor such that the first recording channel is enabled to pass the first arriving electrical signals. The second recording channel is enabled at a time related to but greater than the time interval between the reference time and the appearance of electrical signals at the input to the enabled first channel such that the second recording channel is only enabled to pass later appearing electrical signals.

The variable length pulse is also utilized to provide other switching functions at times related to the last preceding interval of time indicated by the charge on the capacitor.

Many objects and advantages of the present invention will become apparent to those skilled in the art as the following detailed description of the same unfolds when taken in conjunction with the accompanying drawings in which:

FIGURE 1 diagrammatically illustrates an acoustic well logging system provided by one embodiment of the present invention;

Figures 5, 6:
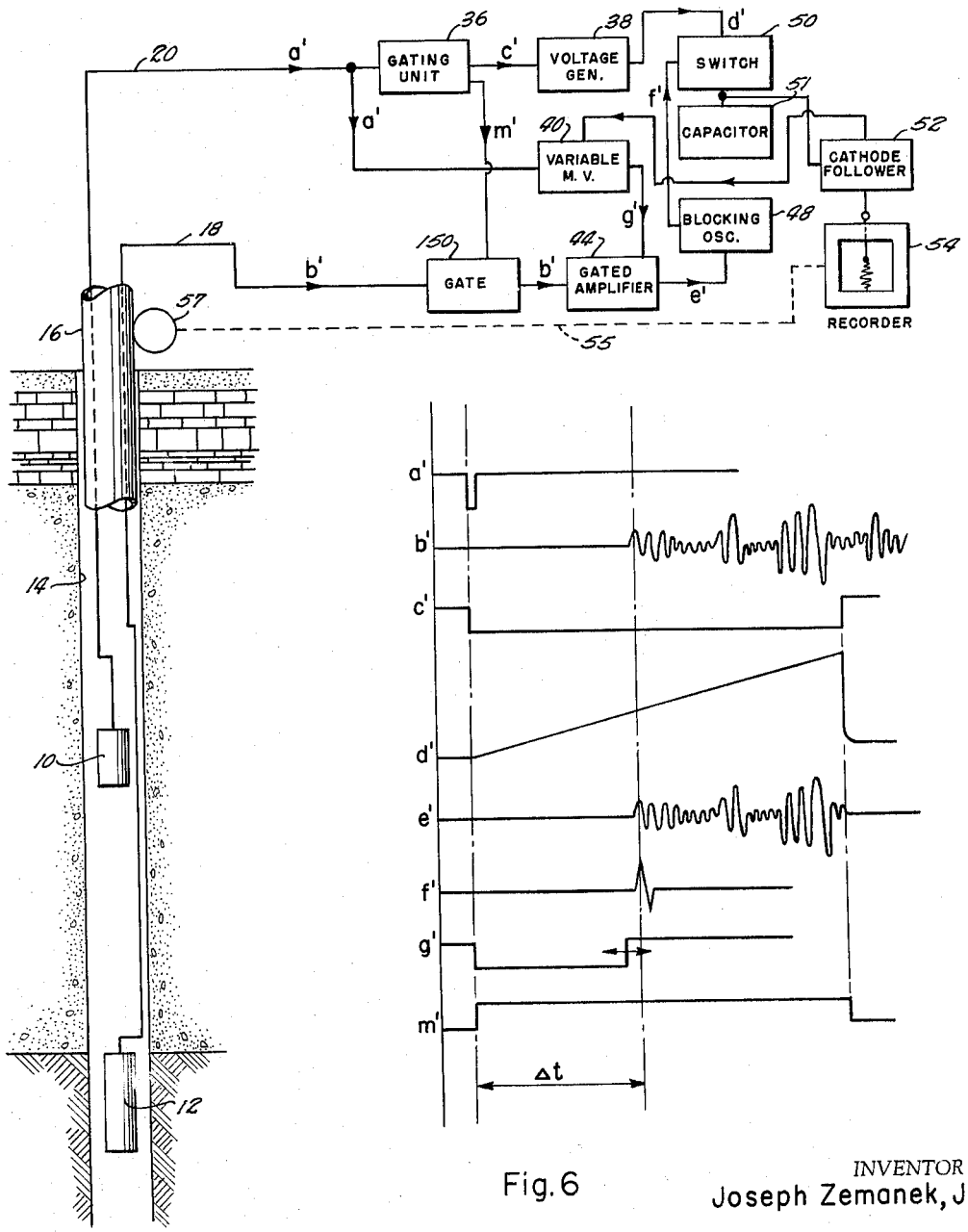
Figure 7:
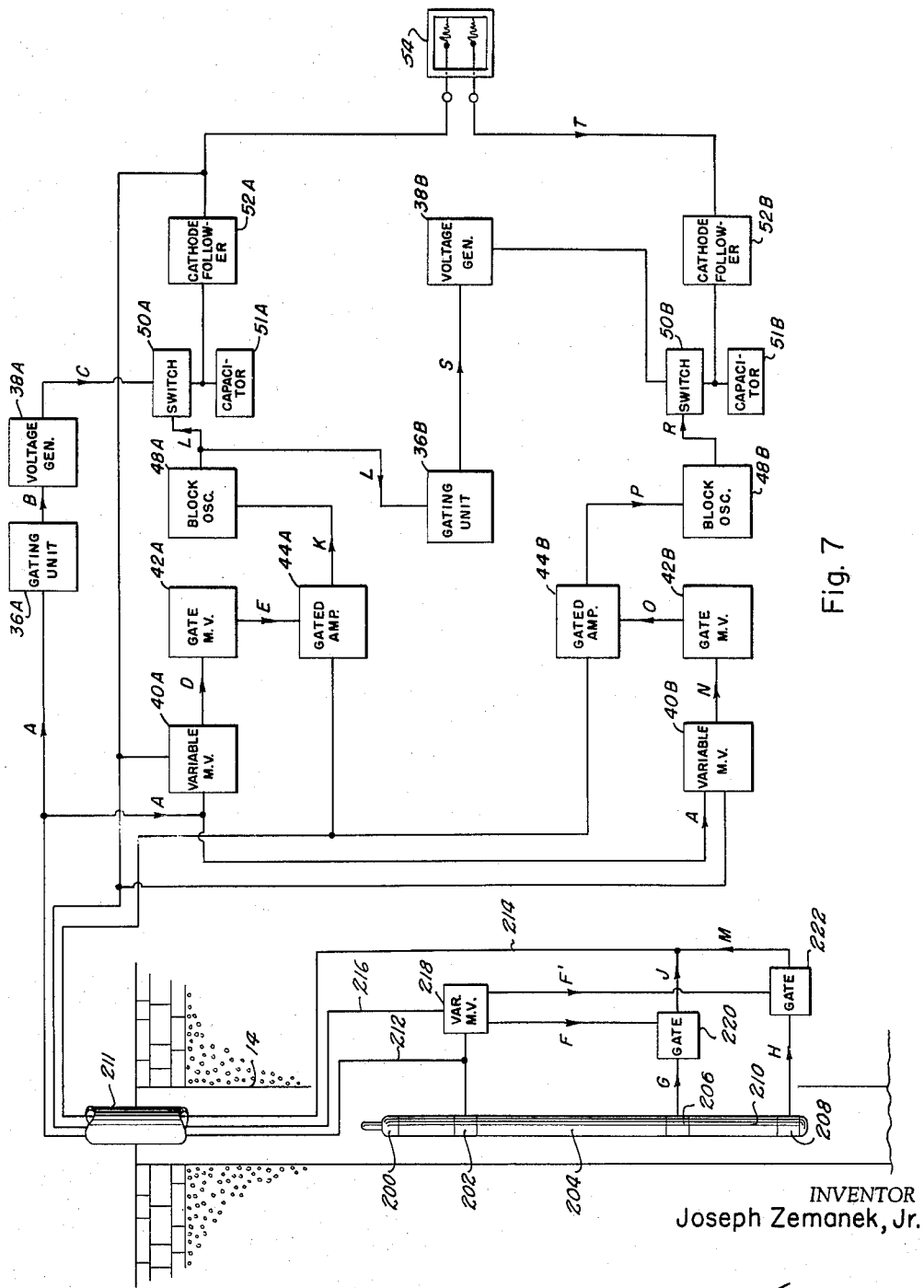
Figure 8:
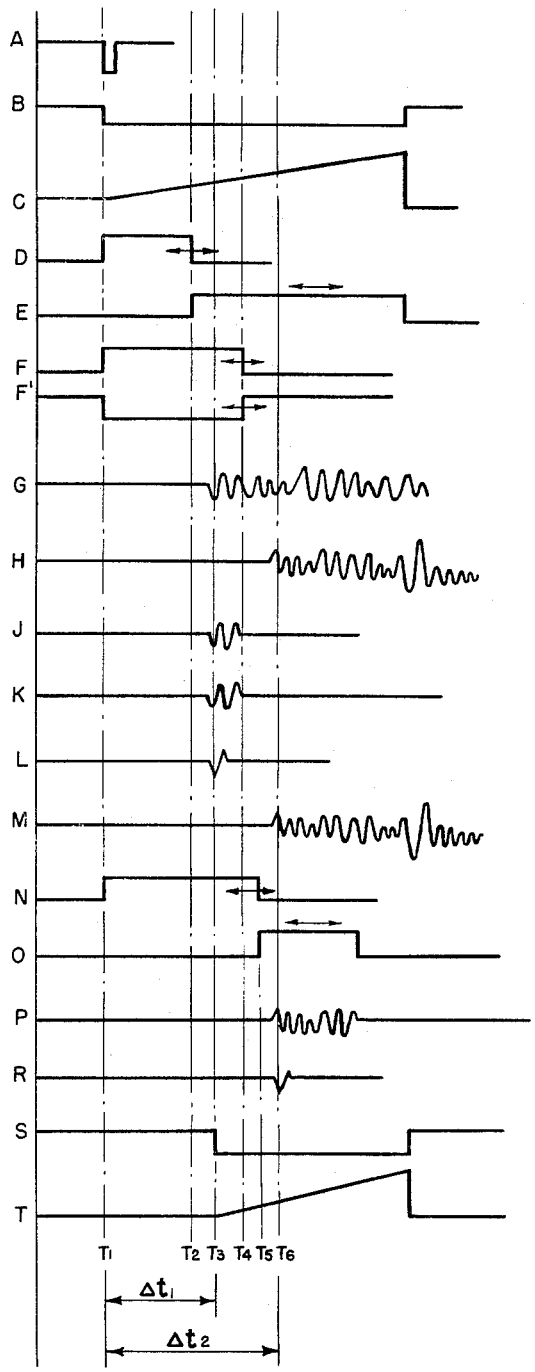

FIGURE 5 diagrammatically illustrates a second embodiment of the present invention;

FIGURE 6 is a plurality of curves illustrating the operation of the system of FIGURE 5;

FIGURE 7 diagrammatically illustrates the manner in which the principles of the present invention may be applied to a two receiver system; and FIGURE 8 shows the wave forms produced at selected points in the system of FIGURE 7.

Figures 1, 2:
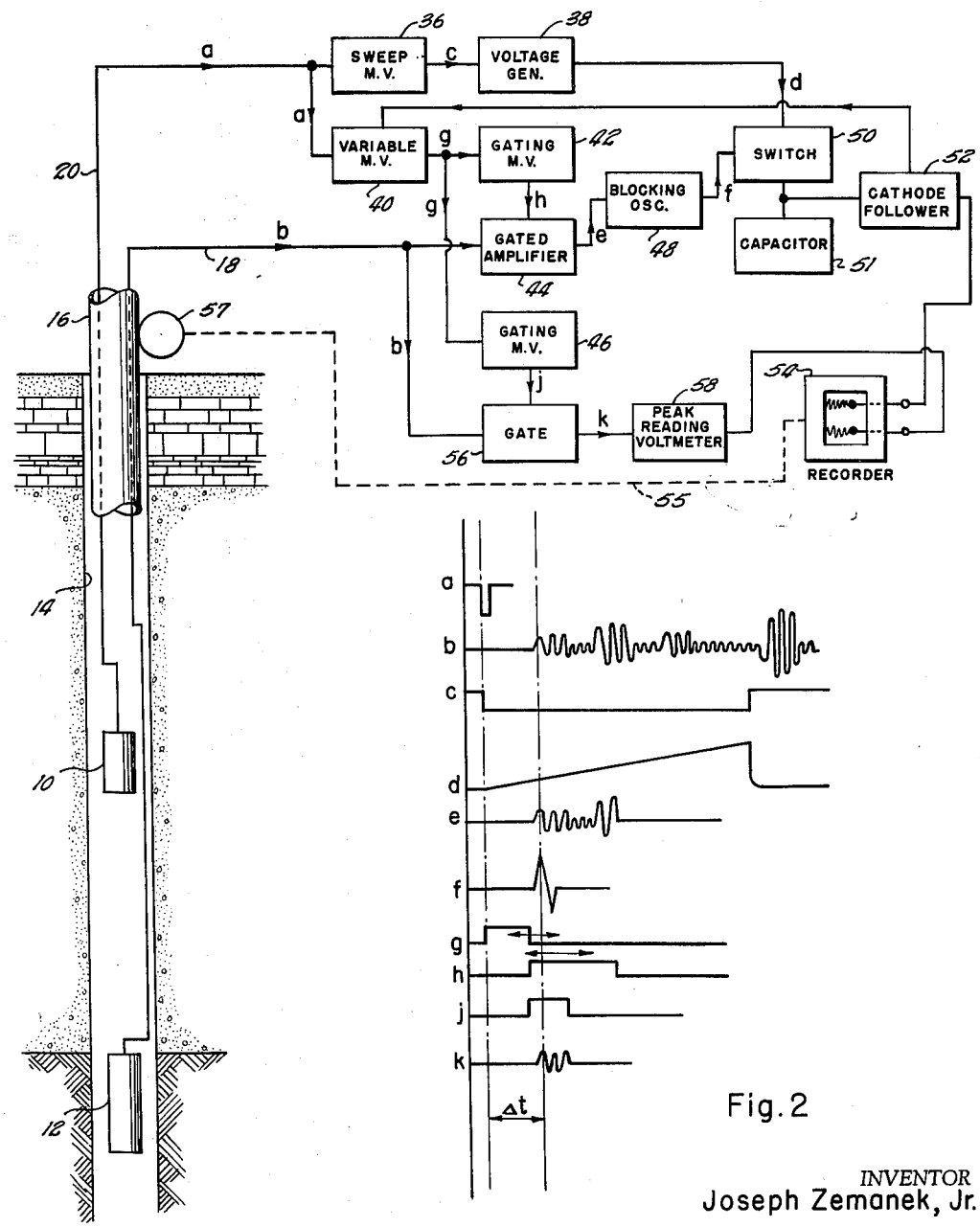
FIGURE 2 is a plurality of curves illustrating the various functions or wave patterns produced at selected points in the system illustrated in FIGURE 1.

Referring now to FIGURES 1 and 2 of the drawings, there is shown in FIGURE 1 a well logging system wherein a transmitter 10 and a receiver 12 are supported within a well bore 14. The transmitter 10 and receiver 12 are normally supported in a predetermined, spaced apart relationship by suitable structure (not shown). Details of a preferred type of supporting structure as well as preferred forms of transducers 10 and 12 are set forth in United States Patent No. 2,757,358 which issued July 31, 1956. The supporting structure containing the transmitter 10 and receiver 12 is suspended for movement along the length of the bore hole 14 by a cable 16 which includes conductors 18 and 20 and may also include a tension bearing member (not shown).

The transmitter 10 produces sharp, spaced, acoustic pulses which travel through the formations adjacent the transmitter to the receiving transducer 12. An electrical pulse $a$ is produced in time coincidence with the generation of the acoustic pulse, which electrical pulse $a$ is applied to conductor 20. An electrical pulse $b$ is generated by the receiver 12 in response to each received acoustic pulse and transmitted to the surface by conductor 18. The elapsed time between the appearance of a pluse $a$ at the sweep multivibrator 36 and the appearance of a pulse $b$ at the gated amplifier 44 is taken as the travel time of the acoustic pulse through the formation and may, therefore, be used to determine the velocity of the acoustic pulse through the formation.

The surface system is seen to include a sweep multivibrator or gating unit 36 that is actuated by the electrical pulse $a$ applied to the conductor 20 in time coincidence with the generation of an acoustic pulse by transmitter 10. The output of the gating unit 36 is a negative pulse $c$ which is coupled directly to a voltage generator 38. The voltage generator 38 produces a voltage $d$ which changes monotonically (i.e., without change in sign of the slope thereof) from an initial value following actuation of the gating unit 36.

The gated amplifier 44 produces a signal $e$ responsive to the application of electrical signal $b$ from the conductor 18. The signal $e$ is applied to the blocking oscillator 48 which produces a pluse $f$ responsive thereto. The pulse $f$ is effective to momentarily close the switch 50 thereby allowing the capacitor 51 to be charged to a voltage equal to the magnitude of the monotonically changing voltage. The voltage across the capacitor 51 is proportional to the travel time of the acoustic pulse through the formation and inversely proportional to the velocity of the acuostic pulse. Thus, by measuring the voltage across the capacitor 51, a determination may be made of the velocity of acoustic pulses through the formations adjacent the transmitter 10 and receiver 12.

The measurement of the voltage across the capacitor 51 may be made in many different ways. However, the preferred manner is to couple the potential across the capacitor 51 through a cathode follower 52 to a strip chart recorder 54. The high input impedance of the cathode follower 52 minimizes discharge of the capacitor insuring that the charge on the capacitor 51 will be indicative of the transit time of the last acoustic pulse. The recorder 54 may be driven by a coupling 55 controlled by a pulley 57 adjacent the cable 16 whereby movement of the chart paper of recorder 54 is directly related to the position of the logging tool in the well bore.

From the above description, it is evident that the potential which is present on the capacitor 51 is a function on the time between receipt of the pulse $a$ at the gating unit 36 and the receipt of a signal $b$ at the amplifier 44. The system described above is substantially the same as the system disclosed in Reissue Patent Serial No. 24,446.

If a positive output pulse from the gating unit 36 were coupled to the amplifier 44 such that the amplifier 44 would be enabled for the duration of the pulse $c$, the operation of the system would be disclosed in Reissue Patent Serial No. 24,446.

The received acoustic signals are often of very low energy. As the amplitude of the electrical signal $b$ produced by the receiving transducer 12 is intimately related to the intensity of the acoustic energy which impinges upon the transducer, the electrical signal $b$ may be of relatively small amplitude. Often times sufficient noise is generated within the bore hole by various phenomena to produce signals $b$ that, if amplifier 44 is enabled, will trigger the blocking oscillator 48, causing the voltage $d$ to be sampled by the capacitor 51, and thereby providing erroneous information. It is most desirable that the gated amplifier 44 be enabled immediately prior to the time that the receiver 12 receives the acoustic energy generated by the transmitter 10 to minimize the possibility of spurious noise creating a false indication of the acoustic velocity of the formation. However, the amplifier 44 must be enabled prior to the time that the acoustic energy is received by the receiver 12 or the sampling of the voltage $d$ by capacitor 51 will occur after the actual first arrival of the acoustic energy, also providing erroneous information as to the acoustic velocity of the formation of interest.

In accordance with the principles of the present invention, the amplifier 44 is enabled at a time following the appearance of pulse $a$ at the gating unit 36 equal to the difference in the transit time of the last preceding acoustic pulse and the maximum change in transit time produced by change in character of the formation being logged.

The maximum change in the transit time of consecutive acoustic pulses may be computed by the formula:

$$T = \frac{\left(\frac{1}{V_1} - \frac{1}{V_2}\right)}{PRF/S} \quad (1)$$

where:

$T$ = maximum change in transit time of consecutive pulses
$V_1$ = minimum acoustic pulse velocity of formations to be logged
$V_2$ = maximum acoustic velocity of formations to be logged
$PRF$ = pulse repetition frequency of acoustic pulse in pulses/second
$S$ = speed of transducer in feet/second Thus, for example, if the slowest acoustic velocity through the formations to be logged is known to be 10,000 feet/second and the fastest acoustic velocity through the formations to be logged is known to be 20,000 feet/second, the PRF of the transmitter is 20 pulses/second and the speed of the logging tool along the well bore is 2 feet/second, the maximum change in transit time will be 5 microseconds from one pulse to the next. If the gated amplifier 44 were enabled at a time equal to a $T_L$—5 microseconds after generation of the signal $a$, where $T_L$ is the transit time of the last preceding acoustic pulse, the gated amplfier would always be open to the acoustic energy, but the amplifier would be operative for a minimum time and any noise created prior to the time that the amplifier 44 is enabled would not be passed and consequently could not create erroneous readings.

In accordance with the preferred embodiment of the present invention, the electrical signal $a$ produced in time coincidence with the generation of the acoustic pulse is also applied to the variable multivibrator 40, causing the variable multivibrator 40 to produce a positive going pulse $g$. As the signal produced by the multivibrator 40 goes negative at the end of the pulse $g$, the gating multivibrator 42 produces a positive going pulse $h$ which enables the amplifier 44.

The output of the cathode follower 52 is applied to the variable multivibrator 40 as a bias which controls the length of the pulse $g$ to be substantially equal to $T_L$ of the last preceding acoustic signal in the absence of additional bias. Additional biasing means are also provided for either increasing or decreasing the length of the pulse $g$ by a predetermined constant amount. By adjusting the additional biasing means to reduce the pulse length by a constant time T, as computed using Equation 1, for all values of the variable bias, the length of the pulse $g$ is made equal to $T_L - T$. As the amplifier 44 is enabled at the end of pulse $g$, the amplifier 44 is, therefore, enabled at a time related to the transit time of the last preceding acoustic pulse that allows the amplifier 44 to be enabled immediately prior to the receipt of the electrical energy $a$.

It is also often desirable to measure the amplitude of the pulses received by the receiver 12. Such amplitude measurements may be used, for example, in making cement logs which indicate whether the cement that is used for sealing off certain areas of the bore hole is bonded to the casing. Thus, the output $g$ of gate 40 may also be applied to the gating multivibrator 46 which produces a positive pulse $j$. The gate 56 is enabled by the pulse $j$ produced by the gating multivibrator 46, and produces an output $k$ responsive to the presence of signal $b$. The signal $k$ is impressed upon the peak reading voltmeter 58 for the duration of the pulse $j$. The reading of the peak reading voltmeter 58 may also be applied to the recorder 54 for purposes of making a permanent record of the same. By controlling the length of the pulse $j$ and controlling the time relations between the signal $j$ and a suitable reference time such as the pulse $g$ or pulse $f$, it is possible to make amplitude logs of any desired portion of the acoustic wave as represented by the signal $b$. Delay lines, variable multivibrators or other suitable means may be used to provide the desired time relation.

Figure 3:
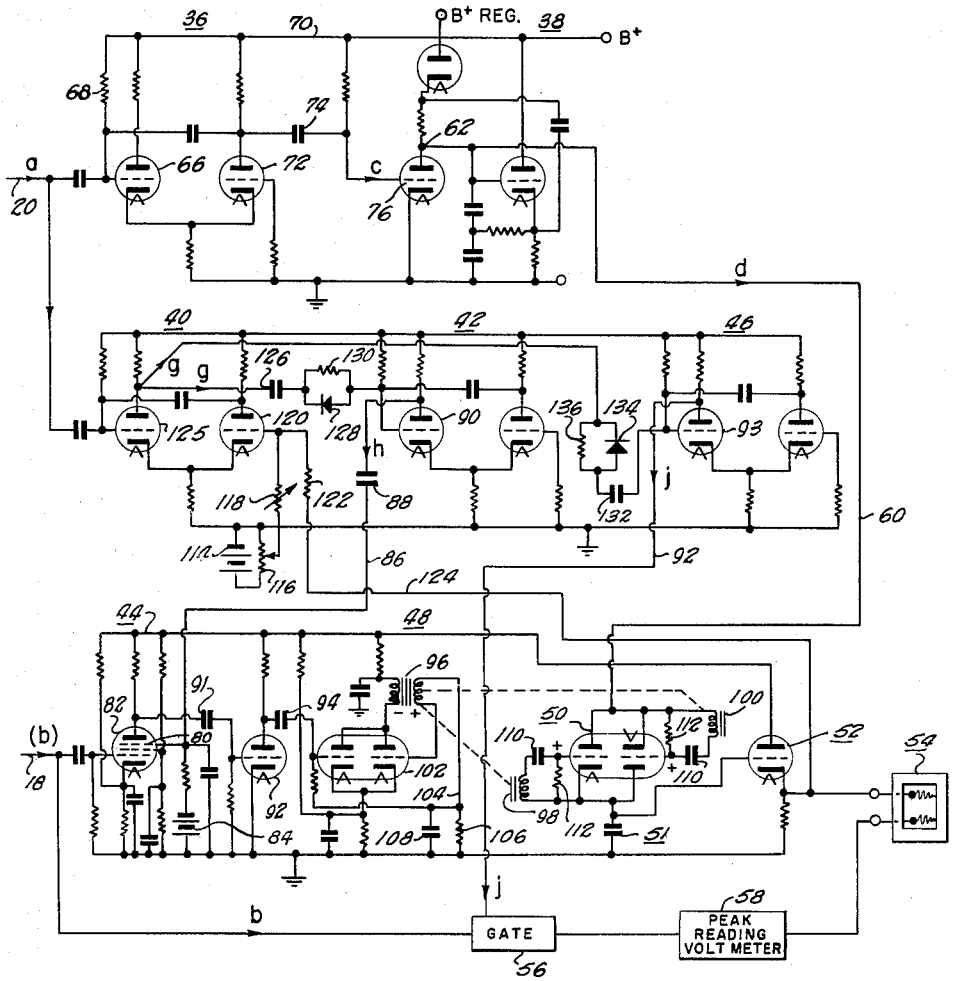
FIGURE 3 is a schematic diagram of a portion of the system diagrammatically represented in FIGURE 1.

The operation of the system described with reference to FIGURE 1 will now be described in greater detail with reference to FIGURES 2, 3 and 4.

The switch 50 in the form illustrated is a double triode clamp in which the plate of a first triode and the cathode of a second triode are directly connected together and are connected to the conductor 60 which leads to the output point 62 of the voltage generator 38. The remaining cathode and plate are connected directly together and are in turn connected through the capacitor 51 to ground.

The upper terminal of the capacitor 51 is connected to the grid of a triode which is connected as a cathode follower 52. The output of the cathode follower 52 is connected to the recorder 54 as shown. The cathode follower 52 provides the necessary isolation between the capacitor 51 and the recorder 54. It is important that the capacitor 51 be coupled to a high impedance load to prevent discharge of the capacitor 51.

The gating unit 36 is suitably what is commonly termed a single shot or monostable multivibrator. The triode 66 of the gating unit 36 is normally conductive, its grid being connected by way of resistor 68 to a source of positive potential such as represented by the B+ bus 70. Upon receipt of the negative going pulse $a$ of FIGURE 2 through conductor 20, the grid of tube 66 is driven negative to reduce the anode-cathode current and thereby lower the cathode voltage and initiate current flow through the second tube 72. The output from the gating unit 36 is coupled to the voltage generator 38 by a capacitor 74. The output of the gate 36 is a negative going pulse as illustrated at $c$ of FIGURE 2. The duration of the pulse $c$ is established by the size of the various resistors and capacitors associated with the multivibrator in the method well known in the art. For a general treatment of the construction and operation of such multivibrators, reference may be had to Wave Forms, vol. 19 of the M.I.T. Radiation Laboratory Series, McGraw-Hill, 1949, at section 5.5, page 166.

Similarly, the voltage generator 38 is representative of generators for producing a voltage which varies from a predetermined initial value, shown as zero in FIGURE 2, following an initiating pulse. In the form illustrated, the circuit is known in the art as a boot strap linear sweep generator with a compensating network. The system together with its controlling multivibrator is of the type illustrated in the above M.I.T. reference, Wave Forms, at page 277, FIGURE 7.23. The voltage between point 62 and ground is developed across the capacitors connected between point 62 and ground. In the particular voltage generator shown, the potential at point 62 will vary substantially linearly following the application of the gating pulse $c$ to the grid 76.

Thus, a monotonically varying voltage $d$ is produced responsive to the presence of a negative going pulse $a$ at the input of the gating unit 36. The monotonically varying voltage $d$ is produced for a time dependent upon the duration of the pulse $c$ produced by the gating unit 36 and, therefore, the length of the pulse $c$ produced by the gating unit 36 must be at least as long as the time required for the slowest traveling acoustic pulses to travel from the transmitter 10 to the receiver 12. In actual practice, the length of the pulse $c$ will be many times the maximum travel time of the acoustic energy. The monotonically varying voltage $d$ produced by the voltage generator 38 is applied to the plate of a first triode and a cathode of a second triode which function as the switch 50. At such times as the triodes of the switch 50 are conductive, the capacitor 51 will sample the voltage $d$ and charge or discharge as necessary to make the voltage on the capacitor 51 equal to the voltage produced by the generator 38 at the particular time that sampling occurs. The recorder 54 continuously monitors the charge on the capacitor 51.

By sampling the voltage produced by the voltage generator 38 at the instant the signal $b$ produced by the receiver 12 responsive to the receipt of acoustic energy is applied through the line 18 to the gated amplifier 44, the potential on the capacitor 51 can be used as an indication of the travel time of the acoustic energy through the adjacent formations.

In the gated amplifier 44 shown, the suppressor grid 80 of the pentode 82 is biased negatively by battery 84. The negative bias maintains the pentode 82 normally cut off. To permit the pentode 82 to conduct, the suppressor grid is coupled by way of conductor 86 and capacitor 88 to the plate of the triode 90 of the gating multivibrator 42. As shown in FIGURE 2, the output $h$ of the gating multivibrator 42 is a positive going pulse, the gated amplifier 44 being enabled for the duration of the pulse $h$. The plate of the pentode 82 is coupled through capacitor 91 to the grid of a triode 92 which serves as the second stage of the gated amplifier 44. Thus, during the time the gated amplifier 44 is enabled by the positive going pulse $h$, it will have an output $e$ responsive to the input signal $b$. The output $e$ of the gated amplifier 44 is taken from the plate of the triode 92 and applied to the blocking oscillator 48 through capacitor 94.

The blocking oscillator 48 in the form illustrated is a circut which produces, in response to an input pulse, an output voltage oscillation or pulse $f$. In the form illustrated, application of the output signal $e$ from the gated amplifier 44 to the first grid of the blocking oscillator 48 produces a single cycle of current variation in the pulse transformer 96 which is magnetically coupled to the grids of the double triodes that comprise the switch 50. The pulse transformer 96 has four windings, two of which are used in the oscillator circuit 48 and the remaining two windings, 98 and 100, control conduction of the triodes of the switch 50. As illustrated, one of said two windings is connected at one terminal to one grid of tube 102 and at the other terminal to conductor 104.

A parallel RC circuit, including a resistor 106 and capacitor 108 is connected between conductor 104 and ground. The parallel RC circuit functions as a timing means which controls the recovery period of the blocking oscillator. Preferably, the recovery time of the blocking oscillator 48 is longer than the duration of the pulse $h$ produced by the gating multivibrator 42 insuring that the blocking oscillator 48 will be actuated to close the switch 50 but once during each cycle of operation of the transmitter 10.

In this figure, the dashed lines diagrammatically represent the magnetic coupling to the primary of the pulse transformer 96 so that the flux generated in the common core of the transformer 96 by a current flowing in one winding thereof produces similar voltage pulses in each of the other windings. The polarity of the pulses applied to the grids of the triodes of the switch 50 are made the same as the grid polarity of the oscillator tube 102 and opposite to that of the plate polarity of oscillator tube 102. The voltage developed in the grid circuits of the switching triodes, in other words, the circuits containing capacitors 110 and resistors 112, is a restraining force on the triodes which maintains them non-conductive or in a normally open circuit condition. The restraining force or voltage is maintained at a predetermined level depending on the time constants of the grid circuits of the triodes. Pulses from the blocking oscillator 48 applied to the foregoing grid circuits in opposition to the restraining force or voltage momentarily render the triodes conductive. Thus, the output pulse $f$ from the blocking oscillator is effective to close or render the triodes conductive thereby closing the switch 50 and permit current to flow to or from the condenser 51 to charge or discharge the condenser 51 to the voltage then present at the plate 62 of the voltage generator 38.

The blocking oscillator 48 is triggered at a time T after the transmitter 10 is energized, the time T being equal to the transit time of the acoustic pulse through the formations to be logged. The blocking oscillator produces an output pulse $f$ which is effective to render the triodes of the switch 50 conductive allowing the condenser 51 to charge or discharge to a voltage equal to the voltage developed by the voltage generator 38 at the time the switch 50 closes. As the voltage generated by the voltage generator 38 is proportional or related to the time of travel of acoustic pulse, the voltage across the capacitor 51 may be measured to give a determination of the travel time of the acoustic pulse and thereby obtain an indication of its velocity.

The variable multivibrator 40 is similar to the gating unit 36, but includes an additional biasing circuit comprising a source of negative potential which is represented by a battery 114 connected in parallel with a potentiometer 116. The tap of the potentiometer 116 is connected through a variable resistor 118 to the grid of the triode 120. The gride of the triode 120 is also connected through a resistor 122 and a conductor 124 to the output of the cathode follower 52.

The variable multivibrator 40 is also actuated by the pulse $a$ such that the variable multivibrator 40 becomes operative at the same instant as the gating unit 36. The length of the pulse $g$ produced by the variable multivibrator 40 varies in accordance with the bias provided at the output of the cathode follower 52 as controlled by resistor 118 and the bias provided by the battery 114 as controlled by the potentiometer 116.

Figure 4:
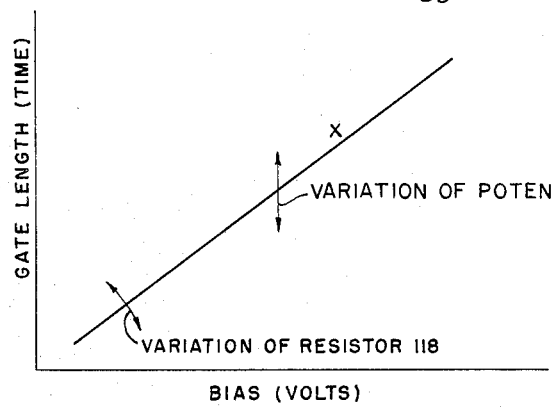
FIGURE 4 is a curve showing the manner in which varying the bias applied to a gating circuit varies the pulse length of the signal produced by the gating circuit.

As illustrated in FIGURE 4, varying the potentiometer 116 is effective to cause the curve X to move vertically without change in slope. Thus, variation of the potentiometer 116 is effective to produce a constant change in length of the pulse $g$ for all values of bias voltage. As also illustrated in FIGURE 4, varying the resistance of the variable resistor 118 will change the slope of the curve X which represents the relationship between the applied bias voltage and the length of the pulse $g$. Thus, if the resistor 118 is adjusted such that the slope of the curve shown in FIGURE 4 is very steep, a very small change in bias voltage will produce a large change in the length of the pulse $g$ produced by the variable multivibrator 40. On the other hand, if the variable resistor 118 is adjusted such that the curve X is virtually horizontal, the length of the pulse $g$ will change very little for a large increase in bias voltage.

According to the specific examples disclosed herein, the voltage $d$ produced by the voltage generator 38 is a straight line function in which the increase in the voltage is directly proportional to time. As the curve X is also a straight line function, by adjusting the variable resistor 118 until the slope of the curve X is substantially equal to the slope of the curve which represents the voltage $d$ produced by the voltage generator 38, the length of the pulse $g$ produced by the variable multivibrator 40 will be substantially equal to the time required for the voltage generator 38 to produce the voltage which is sampled by the condenser 51. If the voltage function produced by the sweep generator 38 were non-linear (for example, a rectangular hyperbolic function of time), suitable circuitry could be utilized to cause the shape of the curve X to conform substantially to the shape of the curve representing the output of the voltage generator 38. However, in most instances, the slope of the curve X can be adjusted to obtain the desired time voltage relationship over the necessary working range without the necessity for such modifying circuitry.

With the slope of the curve X made substantially equal to the slope of the voltage $d$, the length of pulse $g$ is substantially equal to the transit time of the last acoustic pulse as represented by the charge on the capacitor 51. The decrease in pulse length equal to time T is obtained by adjusting the variable resistor 116. If it is desired to increase the length of the pulse $g$, the source of potential 114 must be capable of providing a positive voltage to the grid of the tube 120. In this connection, it will be noted that by controlling the slope of the curve X, the length of the pulse $g$ may be made greater or less than the time interval represented by the charge on the capacitor 51, but the difference will not be constant.

The output $g$ of the variable multivibrator 40 is coupled to the gating multivibrator 42 from the plate of the triode 125 through capacitor 126 and an isolating circuit consisting of a diode 128 connected in parallel with a resistor 130. In similar manner, the first triode of the gating multivibrator 46 is coupled to the plate of the triode 125 by a capacitor 132 and an isolating circuit consisting of a diode 134 connected in parallel with resistor 136. The gating multivibrator 42 and the gating multivibrator 46 are each suitably of the type described with reference to the gating unit 36.

As the signal produced by the variable multivibrator 40 goes negative at the end of the pulse $g$, the gating multivibrator 42 will produce a positive going pulse $h$ which is applied from the plate of the tube 90 through capacitor 88 and conductor 86 to the suppressor grid 89 of the gated amplifier 44 as described previously. The pulse $h$ from the gated multivibrator 42 is effective to enable the gated amplifier 44 for a time equal to the length of the pulse $h$. In similar fashion, the gating multivibrator 46 produces a positive going pulse $j$ at the plate of tube 93 as the pulse $g$ goes negative. The pulse $j$ is applied through conductor 92 to the gate 56, causing the gate 56 to open for the duration of the pulse $j$.

In operation of the circuit, in absence of any potential at the output of the cathode follower 52, the length of the pulse $g$ produced by variable multivibrator 40 is made to be very short to insure that the amplifier 44 is enabled prior to arrival of the first acoustic pulse. The length of the pulse $h$ generated by the gating multivibrator 42 must, therefore, be sufficiently long that the gated amplifier will be open to pass the electrical signals resulting from even the slowest arriving acoustic pulses. As the gated amplifier 44 is open only for the minimum time necessary, the possibility that spurious noise will trigger the blocking oscillator prior to the time of arrival of the acoustic pulse and create an erroneous indication of the acoustic velocity is greatly reduced.

The first oscillation of the electrical signal $b$ that passes through the gated amplifier 44 will trigger the blocking oscillator 48. The switch 50 closes momentarily, responsive to the output $f$ from the blocking oscillator 48 allowing the capacitor 51 to be charged to a potential depending upon the transit time of the first acoustic pulse. As the capacitor 51 becomes charged after the first signal $b$ is received, a voltage substantially equal to the charge on the capacitor 51 will be present at the output of the cathode follower 52. The output of the cathode follower 52 is applied to the variable multivibrator providing a positive bias that is effective to lengthen the duration of the pulse $g$. As described with reference to FIGURE 4, by adjusting the variable resistor 118, the effectiveness of the bias voltage produced at the output of the cathode follower 52 can be varied to properly relate the length of the pulse $g$ produced by the variable multivibrator 40 to the transit time of the last received pulse as indicated by the charge on capacitor 51. The potentiometer 116 is adjusted to decrease the length of pulse $g$ an amount equal to the time computed using Equation 1. Thus, after the first acoustic pulse is received, the gated amplifier 44 is only enabled immediately prior to the time of arrival of the next acoustic pulse, but yet provision is made to insure that the amplifier will be open to receive the initial voltage pulse $b$.

Also, as mentinoed previoulsy, the pulse $g$ from the variable multivibrator 40 is also effective to actuate the gating multivibrator 46 which opens the gate 56, allowing the voltage $b$ produced by the receiver 12 to be applied to the peak reading voltmeter 58. The width of the pulse $j$ produced by the gating multivibrator 46 is chosen with regard to the amount of the signal $b$ which it is desired to pass to the peak reading voltmeter 58. Suitable means can also be provided for opening the gate 56 a selected time following arrival of the acoustic energy at the transducer 12 to allow only selected portions of the signal $b$ to be applied to the peak reading voltmeter 58. As shown, only the first arriving pulses will be applied to the peak reading voltmeter 58 due to the short conduction time of the gate 56 and it is the amplitude of these first arriving pulses which is recorded by the recorder 54. The gate 56 may be of any suitable type that is rendered conductive for the duration of a positive pulse. Commercial peak reading electronic voltmeters such as the RCA "High Frequency Volt-Ohmyst" type WV–75A may be employed as the voltmeter 58.

From the foregoing description, it is seen that the length of the pulse $g$ produced by the variable multivibrator 40 is related to the transit time of the last preceding acoustic pulse. The circuitry through which the electrical signals produced by the receiver responsive to the presence of an acoustic pulse pass is enabled at the time that the acoustic pulse of intereset arrives at the receiver or only slightly before. The quality of the velocity logs obtainable using the present invention is greatly improved in that the possibility of spurious noise providing a false indication of the acoustic velocity of the stratum of interest is greatly reduced.

The quality of the amplitude logs obtained using the principles of the present invention is also improved. The peak reading voltmeter 58 indicates the maximum amplitude of electrical signals which are applied to the peak reading voltmeter through the gate 56. As the amplitude of the electrical signals $b$ produced by the transducer 12 is related to the energy level of the acoustic waves which are present at the transducer 12, the quantity indicated by the peak reading voltmeter 58 will provide an indication of the energy level of the acoustic energy which arrives at the transducer 12. The energy level of certain portions of the acoustic energy is often times less than the energy level of earlier or later arriving acoustic energy. If electrical signals produced responsive to these earlier or later arriving, high energy acoustic waves are applied to the peak reading voltmeter 58, the peak reading voltmeter 58 will provide an incorrect indication of the energy level of the particular acoustic energy of interest. As the present invention provides means by which the apparatus for recording the amplitude of the electrical signals is connected to the transducer 12 virtually at the instant of first arrival of the acoustic energy, or at any desired subsequent time related to the first arrival of the acoustic energy, it is practical for the amplitude measuring apparatus to be connected to the transducer 12 only for a desired period of time. It is, therefore, possible to obtain amplitude logs of selected portions of the reflective or refractive waves produced by the acoustic pulses without interference from earlier or later arriving acoustic waves of higher energy level.

FIGURE 5 illustrates a second embodiment of the invention, the wave forms produced at selected locations in the system of FIGURE 5 being shown in FIGURE 6. As shown in FIGURE 5, the output $c'$ of the gating unit 36 is connected to the voltage generator 38 as described previously with reference to FIGURE 1. The output $d'$ of the voltage generator 38 is connected by way of switch 50 to the capacitor 51. The voltage on the capacitor 51 is applied to the cathode follower 52 which drives the recorder 54. The output of the cathode follower 52 is also applied to the variable multivibrator 40 for purposes of varying the width of the pulse $g'$ produced by the variable multivibrator 40 in accordance with the voltage impressed upon the capacitor 51. The output $g'$ from the variable multivibrator 40 is taken from tube 120 (FIGURE 3) rather than tube 125 such that a negative going pulse is produced. At the time the negative going pulse $g'$ ends and the signal at the plate of tube 120 goes positive, the gated amplifier 44 is enabled. The gated amplifier 44 remains enabled until the next acoustic pulse is generated.

The gate 150 is enabled by the positive going pulse $m'$ which is obtained from the plate of tube 66 (FIGURE 3) of the gating unit 36. The gate 150 will remain open for the duration of the pulse $m'$. With the gate 150 open, the gated amplifier 44 enabled, and the voltage $b'$ produced by the receiver 12 responsive to the presence of acoustic energy applied to line 18, the signal $e'$ is produced at the output of gated amplifier 44. The signal $e'$ is applied to the blocking oscillator 48 which produces the pulse responsive thereto. The switch 50 closes momentarily in the presence of the pulse $f'$ allowing the capacitor 51 to charge or discharge to the voltage present at the output of the voltage generator 38.

Thus, in operation of the circuit of FIGURE 5, prior to the time that a pulse is generated by the transmitter 10, the gated amplifier 44 will be enabled and the gate 150 will be closed. The voltage generator will be inoperative and there will be no charge on the capacitor 51.

At the time an acoustic pulse is generated by the transmitter 10, an electrical pulse $a'$ is applied through the conductor 20 to the input of the gating unit 36 and the variable multivibrator 40. At that time, a negative going pulse $c'$ is produced by the gating unit 36. A monotonically varying voltage $d'$ is produced at the output of the voltage generator 38 responsive to the pulse $c'$. A positive going pulse $m'$ is also produced by the gating unit 36 which causes the gate 150 to become open for the duration of the pulse $m'$.

The pulse $a'$ from the transmitter 10 is also effective to trigger the variable multivibrator 40, causing the pulse $g'$ to begin. As the negative going pulse $g'$ begins, the gated amplifier 44 is disabled preventing any signal which may be present on the receiver line 18 being applied to the blocking oscillator 48. The length of the negative pulse $g'$ produced by the variable gate 40 is controlled by the voltage which is present upon the capacitor 51 in the manner described with reference to FIGURES 1–4.

At the end of the pulse $g'$, the gated amplifier 44 will again be enabled such that it produces a signal $e'$ responsive to the presence of the signal $b'$. The signal $e'$ from amplifier 44 causes the blocking oscillator 48 to produce the pulse $f'$ which is effective to close the switch 50 and allow the capacitor 51 to be charged to the voltage at the output of the voltage generator 38.

In utilizing the embodiment of the invention shown in FIGURE 5, it is desirable that the relaxation time of the blocking oscillator 48 be at least as long as the length of the pulse $m'$ to insure that the switch 50 is not closed twice in the interval between the generation of successive acoustic pulses. It would be possible to operate the system shown in FIGURE 5 if the gate 150 were eliminated. However, if the blocking oscillator 48 were actuated by an electrical pulse on line 18 created by spurious noise or other sources, the switch 50 could be closed at a time after the end of pulse $c'$ but prior to creation of the next succeeding acoustic pulse and the capacitor 51 would be completely discharged. The length of the pulse $e'$ produced by the variable gate 40 would be very short due to the lack of positive bias from the cathode follower 52 and the very desirable noise protection feature provided by the present invention would no longer be available. Thus, the gate 150 prevents undesired closure of the switch 50 and consequent discharge of the capacitor 51 if the relaxation time of the blocking oscillator is greater than the lenght of the pulse $m'$.

FIGURES 7 and 8 illustrate still another embodiment of the invention wherein a system that utilizes a transmitter and two receivers is provided. In two receiver systems where two receivers feed a single conductor, a problem exists in selectively connecting the two receivers to the conductor in that the transit time of a signal along the length of the conductor may often be in the order of 200 microseconds or more whereas the time required for the acoustic energy to travel through the formation from one receiver to the second receiver may be in the order of only 100 microseconds or less. It is to be recognized that the above figures are given for example only. Thus, if the switching of the two receivers to the conductor is controlled from the surface, the acoustic energy will reach the second receiver prior to the time that a control signal from the surface produced responsive to the signal of the first receiver could cause the desired down hole switching. According to this embodiment of the invention, the variable bias voltage provided by the charge on the capacitor is utilized to obtain the desired switching at a time related to the transit time of the last preceding pulse of acoustic energy.

As shown in FIGURE 7, the exploring tool 200 includes a plurality of transducers, including a transmitter 202, a first receiver 206, and a second receiving transducer 208. An acoustic insulating member 204 separates the transmitter 202 and receiver 206 and the insulating member 210 separates the receiver 206 and receiver 210. The exploring tool 200 is supported for movement along the well bore 14 by the cable 211. Cable 211 includes conductors 212, 214 and 216, and may also include a tension bearing member (not shown). For a detailed description of a suitable exploring tool and the transducers incorporated therein, reference may be made to Patent No. 2,757,358, referred to previously.

The transmitter 202 is connected by conductor 212 to a gating unit 36A, a variable multivibrator 40A and a variable multivibrator 40B which are located at the surface. The transmitter 202 is also connected to a variable multivibrator 218, which is peferably located within the exploring tool 200. The variable multivibrator 218 is connected at one output terminal to a normally closed gate 220 and at a second output terminal to a normally open gate 222. The gates 220 and 222 are also preferably located within the exploring tool 200. The output of the receiver 206 is connected through the gate 220 to the conductor 214. In similar fashion, the receiver 208 is connected through the gate 222 to the conductor 214. The conductor 214 connects to the gated amplifier 44A and to the gated amplifier 44B.

At time $T_1$, the transmitter 202 is energized and produces an acoustic pulse. An electrical pulse A is also produced in time coincidence with the generation of the acoustic pulse. The electrical pulse A is applied to the gating unit 36A through conductor 212, causing the gating unit 36A to produce a negative going pulse B which is applied to the voltage generator 38A. The voltage generator 38A produces a voltage C responsive to the negative pulse B. The voltage C changes monotonically with time as shown in FIGURE 8. The output of the voltage generator 38A is connected through a normally open switch 50A to capacitor 51A. Cathode follower 52A is provided for coupling the voltage present on the capacitor 51A to the recorder 54.

Electrical pulse A is also effective to cause the variable multivibrator 40A to produce a positive going pulse D whose pulse length varies depending upon the voltage present on the capacitor 51A. At such time $T_2$ as the pulse D begins to go negative, the gate multivibrator 42A is actuated causing the gate multivibrator 42A to produce a positive going pulse E. Positive going pulse E is effective to enable the gated amplifier 44A.

The pulse A produced by the transmitter 202 is also applied to the variable multivibrator 218 which produces a positive going pulse F that is applied to the normally closed gate 220 and a negative going pulse F' that is applied to the normally open gate 222. The positive going pulse F is effective to open the normally closed gate 220 applying the signal J to conductor 214. The negative pulse F' closes the normally open gate 222 preventing the output of the receiver 208 being applied to the line 214 for the duration of the pulse F'. Thus, for the duration of the pulses F and F', time $T_1$ to time $T_4$, the signal G produced by the receiver 206 responsive to the presence of acoustic energy will be applied to the gate 220 whose output J is applied to line 214. On the other hand, the signal H produced by the receiver 208 will be contained by the closed gate 222 for the duration of the pulse F'. In this connection, it is to be noted that the receiver 206 is positioned nearer the transmitter 202 than the receiver 208, and, therefore, the acoustic pulse produced by the transmitter 202 will appear at the receiver 206 first. Any signal which is produced by the receiver 208 prior to the time $T_4$ will be an undesired signal.

The signal J applied to the line 214 by gate 220 is applied to the gated amplifier 44A and the gated amplifier 44B. Only the amplifier 44A is enabled and the gated amplifier 44B will, therefore, not produce an output responsive to the presence of the signal J. The gated amplifier 44A produces an output signal K responsive to the presence of the signal J which is applied to the blocking oscillator 48A. Responsive to the presence of the signal K, the blocking oscillator 48A produces a pulse L which is effective to momentarily close the switch 50A, allowing the capacitor 51A to charge to the potential of the monotonically changing voltage C.

To this point, the operation of the apparatus of FIGURE 7 is quite similar to that of the apparatus shown in FIGURE 1, the only difference being the incorporation of the variable multivibrator 218 and the gate 220 as additional elements.

According to this embodiment of the invention, the output of the cathode follower 52A is connected by conductor 216 to the variable gate 218. The conduction time of the variable gate 218 is controlled by the bias from the cathode follower 52A such that the length of the pulses F and F' is equal to $\Delta t_1$ of the last preceding acoustic pulse plus a predetermined amount of time, where $\Delta t_1$ is the time interval between generation of an acoustic pulse and receipt of the acoustic pulse at receiver 206.

Thus, at time $T_4$, the pulses F and F' produced at the output of the variable gate 218 will end, allowing the gate 220 to assume its normally closed condition and allowing the gate 222 to assume its normally open condition. The signal J passed by the gate 220 will end and the gate 222 will have an output M at time $T_6$ responsive to the presence of a signal H from the transducer 208, which output M is applied through conductor 214 to the gated amplifier 44A and to the gated amplifier 44B. Although the gated amplifier 44A will be enabled, the blocking oscillator 48A will have pulsed and, as the relaxation time of the blocking oscillator 48A is greater than the length of the pulse E produced by the gate multivibrator 42A, the amplifier 44A will be disabled prior to the time that the blocking oscillator 48A could again produce a pulse L to close the switch 50A.

The gated amplifier 44B is enabled at time $T_5$ following the end of the pulse F' at time $T_4$, but prior to the arrival of the signal M at time $T_6$ by the positive going pulse O produced by the gating multivibrator 42B responsive to the end of the positive going pulse N produced by the variable multivibrator 40B. The variable multivibrator 40B produces the positive going pulse N responsive to the presence of the voltage A produced in time coincidence with the generation of the acoustic pulse. The length of the positive going pulse N produced by the variable multivibrator 40B varies dependent upon the charge on the capacitor 51A. Thus, at time $T_5$ which follows time $T_1$ by an amount equal to $\Delta t_1$ plus a predetermined amount of time, the positive pulse N will begin to go negative. As the pulse N goes negative, the gate multivibrator 42B will produce the positive going pulse O which enables the gated amplifier 44B. Time $T_5$ at which the positive pulse N goes negative must follow the end of the pulse F but must precede the arrival of the acoustic energy at the second receiver 208 at time $T_6$ to insure that only the gated amplifier 44A is enabled to receive the signal J, but the gated amplifier 44B is enabled to receive the signal M.

In this connection, it is to be noted that the charge on the capacitor 51A which controls the gate length of the variable multivibrator 218 is the time $\Delta t_1$ of the last preceding acoustic pulse whereas the charge on the capacitor 51A which controls the gate length of the variable multivibrator 40B is the voltage which is related to the time $\Delta t_1$ of the present acoustic pulse.

The variable multivibrator 218 begins to produce the pulses F and F' at time $T_1$ when the potential present on the capacitor 51A is representative of the transit time $\Delta t_1$ of the last preceding acoustic pulse. Although the switch 50A opens prior to the end of pulses F and F' allowing the capacitor 51A to charge or discharge to a potential representative of $\Delta t_1$ of the present acoustic pulse, the delay produced by the length of the conductor 214 is such that the pulses F and F' end prior to the time that the change in potential on capacitor 51A would affect the bias on variable multivibrator 218. The pulse N produced by variable multivibrator 40B does not begin until after the switch 50A opens to allow the capacitor 51A to charge to a potential related to the transit time $\Delta t_1$ of the present acoustic pulse. As the variable multivibrator 40B is normally relatively near the cathode follower 52A, the time delay of a signal between the cathode follower and the variable multivibrator 40B is not significant. The variable bias on the variable multivibrator 40B will, therefore, follow changes in the charge on the capacitor 51A quite rapidly causing the length of the pulse N to be related to the transit time $\Delta t_1$ of the present acoustic pulse.

It will be noted that certain time relationships must be maintained to assure satisfactory operation of the system. Thus, pulse D must end at a time less than $\Delta t_1$ of the last preceding acoustic pulse by the predetermined amount calculated using Equation 1. On the other hand, the pulse F must be longer than $\Delta t_1$ of the last preceding acoustic pulse a sufficient time to insure that the gate 220 will be open when the first receiver 206 produces the electrical signals G responsive to the presence of the acoustic pulse, but the pulse F' must end prior to arrival of the acoustic pulse at transducer 208. The pulse N produced by the variable multivibrator 40B must end at or after the end of pulse F, but prior to the appearance of acoustic energy at transducer 208.

Once the gated amplifier 44B is enabled by the positive pulse O, the signal M produced by the gate 222 is effective to produce a signal P at the output of the gated amplifier 44B. As the signal P is applied to the blocking oscillator 48B, the blocking oscillator 48B will produce at its output terminal a pulse R that is effective to momentarily close the switch 50B and allow the capacitor 51B to be charged to the voltage which is connected through the switch 50B to the capacitor 51B. If desired, the switch 50B may be connected to the voltage generator 38A in which event the charge on the capacitor 51B will be representative of the time required for the acoustic pulse to travel from the transmitter 202 to the second receiver 208. However, the time which is usually of interest is the time required for the acoustic pulse to travel from the receiver 206 to the receiver 208.

The voltage generator 38B which is driven by the gating unit 36B provides a voltage which changes monotonically from a predetermined level beginning at the time that acoustic energy arrives at the receiver 206. The output L of the blocking oscillator 48A is also applied to the gating unit 36B. The gating unit 36B produces a negative going pulse S responsive to the presence of the signal L which enables the voltage generator 38B. The output T of the voltage generator 38B is a monotonically changing voltage similar to the output C of the voltage generator 38A. Thus, the voltage T begins at time $T_3$ which corresponds to the arrival of acoustic energy at the receiver 206. The potential to which the capacitor 51B is charged is applied through the cathode follower 52B to the recorder 54 for purposes of making a permanent record that is indicative of the times required for successive pulses to travel from the receiver 206 to the receiver 208.

From the foregoing, it is evident that by utilizing the principles of the present invention it is practical to connect two recording channels to a single conductor to which electrical signals that are indicative of the occurrence of events to be timed are applied. The first recording channel records the occurrence of the first event to be timed by storing an electrical quantity in an amount related to the time of interest. The elecrical quantity which is indicative of the first event to be timed is then used to enable the second recording channel a predetermined time following the occurrence of the first event. In this connection, it is to be noted that the gate multivibrator 42A could be actuated by the signal A in which event the gated amplifier 44A would be enabled from substantially the instant that the acoustic pulses were first generated and that satisfactory results could be achieved, although the desirable noise protection feature afforded by the present invention would not be present.

Alternatively, the variable multivibrator 40B and the gate multivibrator 42B could be eliminated, the output of the gate multivibrator 42A being connected through a delay line to enable the gated amplifier 44B. If such a system were used, the delay of the delay line would suitably be equal to or slightly less than the minimum time required for an acoustic signal to travel from receiver 206 to receiver 208. In any event, the delay should be such that the gated amplifier is enabled after the end of the electrical signal J and prior to the arrival of electrical signal M at the gated amplifier 44B.

Although the invention has been described with regard to certain preferred embodiments of the same, many changes and modifications will now suggest themselves to those skilled in the art. The invention is, therefore, intended to be limited not to what is shown herein but only as necessitated by the scope of the appended claims.

What I claim is:

1. A system for measuring the acoustic velocity of formations adjacent a well bore that comprises an acoustic pulse transmitter movably positioned in said well bore for periodically generating and transmitting to said formation an acoustic pulse, means for generating a control pulse in time coincidence with the generation of said acoustic pulse, a voltage generator for generating a voltage that increases monotonically as a function of time, said last-named means being connected to said voltage generator so that said voltage is produced responsive to said control pulse, a capacitor, a normally open switch connecting said capacitor to said voltage generator, an acoustic receiver movably positioned in said well bore in predetermined, spaced apart relationship with said acoustic transmitter for producing an electrical signal responsive to the appearance of said acoustic pulse, control circuit means for momentarily closing said switch responsive to said electrical signal, a normally closed gating amplifier connecting said acoustic receiver to said control circuit means, means responsive to the presence of said control pulse for actuating said voltage generator, said last-named means being connected to said normally closed gating amplifier for opening said normally closed gating amplifier, and means biased by the potential to which said capacitor is charged for generating a signal effective to disable said normally closed gating amplifier for a time less than the time interval required for the last preceding acoustic pulse to travel from said acoustic pulse transmitter to said acoustic transducer by an amount substantially equal to the maximum expected change in the time interval of successive pulses due to change in the characteristics of the formations to be logged.

2. A system as defined in claim 1 wherein said last named means comprises a multivibrator having first biasing means effective to vary the pulse length of the pulse produced by said multivibrator responsive to the charge on said capacitor and a second biasing means effective to produce a constant change in pulse length for all values of said first biasing means.

3. In a well logging system of the type comprising a plurality of transducers including at least one transmitter of pulses of acoustic energy and at least one receiver spaced from one another along the length of a borehole and connected by way of an electric circuit to a time-interval measuring means and in which electric signals produced by two of said transducers in response to the appearance of acoustic energy thereat are applied to the time-interval measuring means for production of a quantity representative of the travel time of acoustic energy between two of said transducers, the improvement which comprises:

means for storing said quantity,
a gating circuit connected between a receiver and said time-interval measuring means,
control circuitry for generating a gating voltage at a variable time after appearance of acoustic energy at one of said transducers, means for applying the electric signal from said one of said transducers to said control circuitry to actuate said control circuitry, said gating voltage being produced a variable time after the actuation, said gating voltage being applied to said gating circuit to open said gating circuit at said time for passage therethrough of the electric signal produced by the appearance of acoustic energy at a receiver, and means for applying the output of said storage means to said control circuitry to control the time at which said gating voltage is generated.

4. In a well logging system of the type comprising a plurality of transducers including at least one transmitter of pulses of acoustic energy and at least one receiver spaced from one another along the length of a borehole and connected by way of an electric circuit to a time-interval measuring means and in which electric signals produced by two of said transducer in response to the appearance of acoustic energy thereat are applied to the time-interval measuring means for production of a qauntity representative of the travel time of acoustic energy between two of said transducers, the improvement which comprises:

means for storing said quantity,
amplitude measuring means for recording the amplitude of electric signals from a receiver transducer,
a gating circuit connected between said receiver transducer and said amplitude measuring means, and
control circuitry for generating a gating voltage at a variable time after appearance of acoustic energy at one of said transducers, said gating voltage being applied to said gating circuit to open said gating at said time for passage therethrough of at least a portion of the electric signal produced by the appearance of acoustic energy at a receiver, means for applying the output of said storage means to said control circuitry to control the time at which said gating voltage is generated.

5. The improvement recited in claim 4 wherein said control circuitry includes means for terminating said gating voltage at a fixed time after said variable time, the interval between said variable time and said fixed time being less than the duration of the electric signal produced by the appearance of acoustic energy at said receiver so that only a portion of said electric signal is passed through said gating circuit.

6. In a system for seismic measurements comprising
a recording unit,
subsurface apparatus adapted to be lowered into a borehole,
means supporting said subsurface apparatus in said borehole, said subsurface apapratus comprising three transducers respectively forming an acoustic wave source and two receivers spaced from each other along a vertical line, said receivers being mounted to one side of said wave source,
a single electric circuit means for transmitting signals from said receivers to said recording unit,
means for energizing said wave source to produce acoustic energy reaching said two receivers in succession,
means in each receiver for translating said energy into an electric signal to be transmitted by said circuit means to said recording unit,
switching means in said subsurface apparatus connected between said single electric circuit means and at least one of said receivers, and
actuating means operable in response to the apeparance of said acoustic energy at one of said transducers to actuate said switching means to attenuate the output of said one of said receivers after appearance of said acoustic energy at said receiver, the improvement which comprises:
means responsive to the appearance of said acoustic energy at two of said transducers for production of a quantity representative of the travel time of acoustic energy between said two transducers,
means for storing said quantity, and
control circuitry included in said actuating means for generating a switching voltage at a variable time after appearance of acoustic energy at one of said transducers, said switching voltage being applied to said switching means to attenuate the output of said one of said receivers after appearance of said acoustic energy at said receiver, means for applying the output of said storage means to said control circuitry to control the time at which said switching voltage is generated.

(References on following page)

References Cited by the Examiner

UNITED STATES PATENTS

| | | | |
|---|---|---|---|
| 2,963,646 | 12/1960 | Hicks et al. | 328—129 |
| 3,018,839 | 1/1962 | Isaacson | 181—.5 |
| 3,019,413 | 1/1962 | Brokaw | 181—.5 |
| 3,020,397 | 2/1962 | Pierce et al. | 328—129 |
| 3,177,467 | 4/1965 | Brokaw | 340—18 |

BENJAMIN A. BORCHELT, *Primary Examiner.*

KATHLEEN CLAFFY, SAMUEL FEINBERG,

*Examiners.*

R. M. SKOLNIK, W. KUJAWA, *Assistant Examiners.*